United States Patent [19]
Adachi

[11] 4,445,210
[45] Apr. 24, 1984

[54] TONE ARM MECHANISM FOR A RECORD PLAYER

[75] Inventor: Kengo Adachi, Yokohama, Japan

[73] Assignee: Victor Company of Japan, Limited, Yokohama, Japan

[21] Appl. No.: 273,416

[22] Filed: Jun. 15, 1981

[30] Foreign Application Priority Data

Jun. 16, 1980 [JP] Japan .............................. 55-82986[U]
Jun. 16, 1980 [JP] Japan .............................. 55-82987[U]
Jun. 16, 1980 [JP] Japan .............................. 55-82988[U]

[51] Int. Cl.$^3$ ................................................ G11B 17/00
[52] U.S. Cl. ..................................... 369/230; 369/246
[58] Field of Search ........................ 369/230, 245, 246

[56] References Cited

U.S. PATENT DOCUMENTS

| | | | |
|---|---|---|---|
| 2,952,464 | 9/1960 | Stimler | 369/230 |
| 3,385,603 | 5/1968 | Kropfle | 369/230 |
| 3,534,967 | 10/1970 | Freier | 369/245 |
| 3,717,350 | 2/1973 | Oakley et al. | 369/246 |
| 3,734,512 | 5/1973 | Osborne et al. | 369/230 |

*Primary Examiner*—Steven L. Stephan
*Attorney, Agent, or Firm*—Lowe, King, Price & Becker

[57] ABSTRACT

In a tone arm elevating mechanism, an elevator, which is arranged to raise and lower the tone arm, is driven by a solenoid, and the mechanism comprises a first rotary lever contactable with a portion of the elevator and a second rotary lever arranged to be driven by the solenoid, where the second rotary lever is operatively linked with the first rotary lever by means of an elastic member which prevents transmission of shock. Thus, the reciprocating movement of the solenoid is converted into rotational force to cause the elevator to rise gently and slowly. A viscous and resistive material may be provided to the elevator so that the elevator slowly lowers when the solenoid is deenergized. A portion of the elevating mechanism functions as an electrical switch to detect the highest position of the tone arm, while another portion may also function as another switch to detect the fact that the stylus has been placed on the record disk. The information from these switches may be fed to a circuit which controls various operations of the tone arm, thereby control of horizontal movement of the tone arm as well as antiskating can be accurately and precisely performed.

24 Claims, 7 Drawing Figures

TONE ARM MECHANISM FOR A RECORD PLAYER

BACKGROUND OF THE INVENTION

This invention relates generally to tone arm mechanisms for record players, and more particularly the present invention relates to a mechanism for vertically raising and lowering the tone arm and to a circuit arrangement for detecting the vertical position and/or the status of the tone arm.

In most conventional record players or the like, the tone arm carrying a pickup cartridge with a stylus is moved up and down by using a rotational force from the driving motor operatively connected to the turntable of the record palyer. Namely, the tone arm is raised or elevated from its rest by elevating a member which is usualy called a tone arm elevator, and then the tone arm is swung horizontally to be moved to a given position above a phonograph record, and then the tone arm is lowered so that the stylus thereof is correctly positioned on a given position of the sound grooves of the record disk. After playing the record disk, similar operation is performed to return the tone arm to the rest. However, in such conventional devices, a complex mechanism is required for applying the rotational force of the motor to the tone arm in the form of a reciprocating force. Although there is another conventional tone arm elevating mechanism, in which an additional motor is provided for operating the tone arm in vertical directions, the same problem as the above has been inevitable. Meanwhile, there is a tendency that various mechanical devices are replaced by electrically operated devices in connection with various devices, such as tape recorders, record players or the like. Electrically operated and/or controlled devices are now getting popular because such an electrically operated devices are easy in manipulation, simple in construction, and accurate in operation. Furthermore, such an electrically operated devices usually occupy less space than pure mechanical devices.

Under these circumstances, the inventor of the present invention had an idea of using a solenoid as a driving means of the tone arm, so that an elevator which is located below the tone arm is raised and lowered in accordance with the reciprocating movement of the plunger of the solenoid. However, when a solenoid were simply applied, desired control of the tone arm would not be expected because the plunger of the solenoid instantaneously moves back and forth, applying an undesirable shock or impact to the tone arm. In other words, when a reciprocating force of the solenoid plunger is directly applied to the tone arm, the tone arm is apt to jump up when elevating the same, resulting in deviation of the stylus from a desired position. Similarly, if the lowering operation of the tone arm is simply controlled by such a solenoid, the stylus might be roughly dropped on the record disk, damaging the stylus as well as the record disk.

Apart from the above problem, it is necessary to accurately detect the vertical position and the state of the tone arm in order to electricaly control various operations of the tone arm, such as horizontal movement thereof and antiscating.

SUMMARY OF THE INVENTION

The present invention has been developed in order to provide an improved tone arm mechanism for a record player which does not suffer from the above-mentioned various problems inherent to the conventional elevating mechanism in which driving force for raising and lowering the tone arm has been derived from an electric motor.

It is, therefore, an object of the present invention to provide a tone arm mechanism which is capable of raising and lowering the tone arm of a record player by means of a reciprocating force from a solenoid plunger, where the vertical movement of the tone arm is performed slowly and gently, ensuring precise control in up-down movement of the tone arm.

According to a feature of the present invention, a tone arm elevator, which is arranged to be in contact with the tone arm to raise the same when the elevator rises, is movably provided below the tone arm, and is arranged to be raised by a first rotary lever position below the elevator. The first rotary lever is swingably attached to a shaft, and a second rotary lever is also swingably attached to the same shaft. The first and second rotary levers are opeatively connected by means of a spring so that rotation of the second rotary lever causes the first rotary lever to start rotating. The second rotary lever is engaged with a plunger of a solenoid, so that the movement of the plunger, which tends to move rapidly as soon as being energized or deenergized, is slowly transmitted via the first and second rotary levers to the elevator, and therefore, the tone arm is raised slowly and gently accordingly.

An adjusting screw is provided to the elevator and is arranged to be in contact with the first rotary lever when the first rotary lever is rotated in a given direction to raise the elevator. The adjusting screw is used not only for defining the highest position of the tone arm but also constituting an electrical switch together with the first rotary lever. This switch may be used for detecting the vertical position or height of the tone arm when the tone arm is being raised.

A portion of the elevator, which can be in contact with the tone arm and a portion of the tone arm, which can be in contact with the elevator, may be used as another electrical switch for detecting a particular state of the tone arm, namely the fact that the stylus has been placed on a record disk when the tone arm is being lowered. In accordance with the present invention there is provided a tone arm mechanism for a record player, comprising: (a) first means for raising and lowering a tone arm of a record player with respect to a stationary member to which said tone arm is movably attached, said first means having a member positioned below said tone arm and movable between first and second positions with respect to said stationary member; (b) a first rotary lever rotatable about a shaft attached to said stationary member, and contactable with said first means; (c) a second rotary lever rotatable about a shaft attached to said stationary member; (d) second means for transmitting the rotational force from said second rotary lever to said first rotary lever, said second means having an elastic member for absorbing shock from said second lever; and (e) a solenoid having a plunger operatively linked with said second rotary lever for driving said second rotary lever.

BRIEF DESCRIPTION OF THE DRAWINGS

The object and features of the present invention will become more readily apparent from the following detailed description of the preferred embodiments taken in conjunction with the accompanying drawings in which.

In the drawings, the same or corresponding elements and circuits are designated at like reference numerals.

DETAILED DESCRIPTION OF THE PREFERRED EMBODIMENTS

Figure 1:
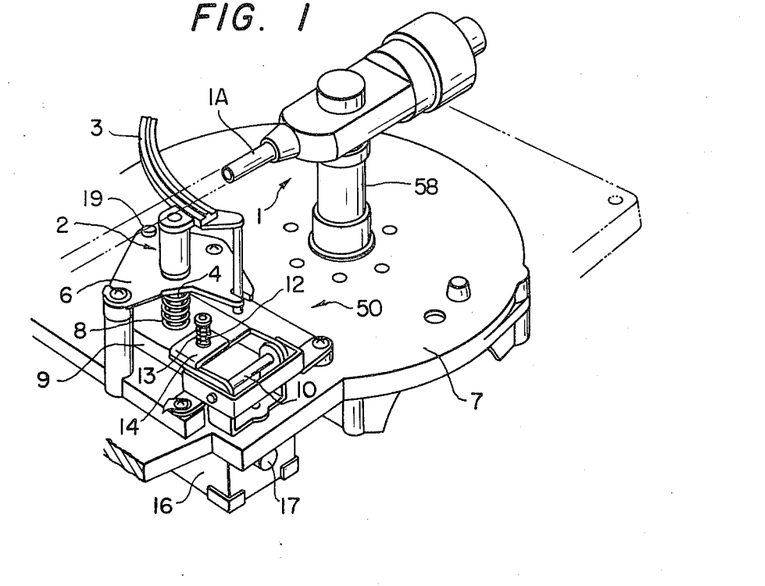
FIG. 1 is a perspective view of a first embodiment of the tone arm mechanism according to the present invention.
Figure 2:
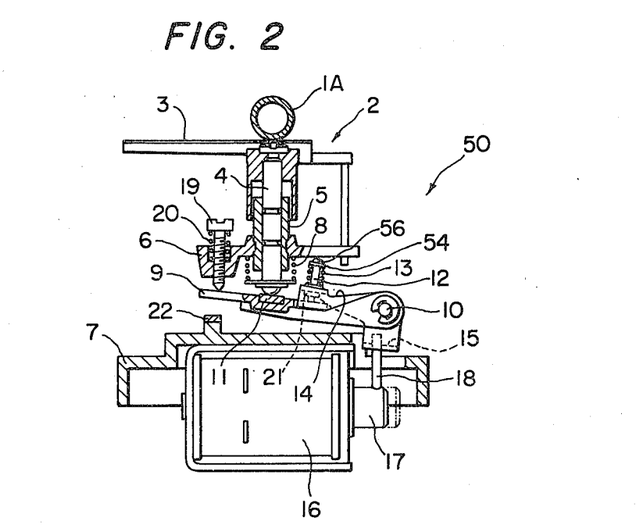
FIG. 2 is a cross-sectional view of the first embodiment tone arm mechanism.

FIG. 1 shows a schematic perspective view of a first embodiment of the tone arm mechanism according to the present invention, and a detailed structure of an elevating mechanism is best seen in a cross-sectional view of FIG. 2. A tone arm 1 of a record player for carrying a pickup cartridge with a reproducing stylus (both not shown for simplicity) is swingably attached to a stationary base plate 7, and is also arranged to be movable vertically in the same manner as in most conventional record players. An elevating mechanism is generally designated at a reference 50, and is fixedly attached to the base plate 7. The elevating mechanism 50 is positioned below a pipe or arm portion 1A of the tone arm 1, and comprises an elevator 2, first and second rotary levers 9 and 14, a solenoid 16, and other auxiliary elements which will be described hereinbelow.

The elevator 2 comprises an arcuate arm 3 and a cylindrical portion integrally formed with or connected to the arcuate arm 3. The cylindrical portion of the elevator 2 and a shaft 4, which will be referred to as an up-down movement shaft, are connected to each other by means of a screw or the like. The reference 5 is a bushing in which the up-down movement shaft 4 is movably received, and in the space between the inner surface of the bushing 5 and the outer surface of the up-down movement shaft 4 is interposed a viscous resistive material, such as silicone oil. The bushing 5 is fixed to a bracket 6, which is secured on the base plate 7. Meanwhile, between a lower portion of the up-down movement shaft 4 and the bracket 6 is provided a coil spring 8, which prevents the elevator 2 from rapid rising. In detail, the spring 8 is interposed between the lower surface of the bracket 6 and a washer fixedly attached to the bottom end of the up-down movement shaft 4 by means of a screw.

The above-mentioned first rotary lever 9 is swingably or rotatably attached to a shaft 10, which is secured to the base plate 7 as shown in FIG. 1, in such a manner that the first rotary lever 9 can rotate about the shaft 10. The first rotary lever 9 is positioned so that a portion thereof is located below the bottom end of the up-down movement shaft 4, and therefore, the up-down movement shaft 4 can be raised by the clockwise rotation of the first rotary lever 9. A piece of rubber 11, which will function as a silencer, is attached to the first rotary lever 9 at a portion which will be in contact with the bottom end of the up-down movement shaft 4. On the surface of the first rotary lever 9 is attached a fixed pin or shaft 12 which projects upwardly from the upper surface of the first rotary lever 9, and the fixed pin 12 is provided with a coil spring 13. In detail, the coil spring 13 is engaged with the fixed pin 12, and is prevented from escaping from the fixed pin 12 by means of a washer 54 and a screw 56 which are attached to the top end of the fixed pin 12. A second rotary lever 14 is also attached to the shaft 10 so that it is rotatable about the shaft 10 in the same manner as the first rotary lever 9. The second rotary lever 14 has a through-hole at one end portion thereof, and this through-hole is engaged with the fixed pin 12 of the first rotary lever 9 in such a manner that a portion of the second rotary lever 14 is interposed or sandwiched between the lower end of the coil spring 13 and the upper surface of the first rotary lever 9. The second rotary lever 14 is generally L-shaped, and in the other end of the second rotary lever 14 is made an elongate hole 15 in which a pin 18 fixed to the plunger 17 of a solenoid 16 is inserted. The solenoid 16 is secured to the lower surface of the base plate 7, and the plunger 17 thereof is movable in a given direction, i.e. leftward in FIG. 2, when energized, and in the other direction, i.e. rightward in FIG. 2, when deenergized. From the above, it will be understood that leftward movement of the plunger 17 will result in clockwise rotation of the second rotary lever 14.

Figure 3:
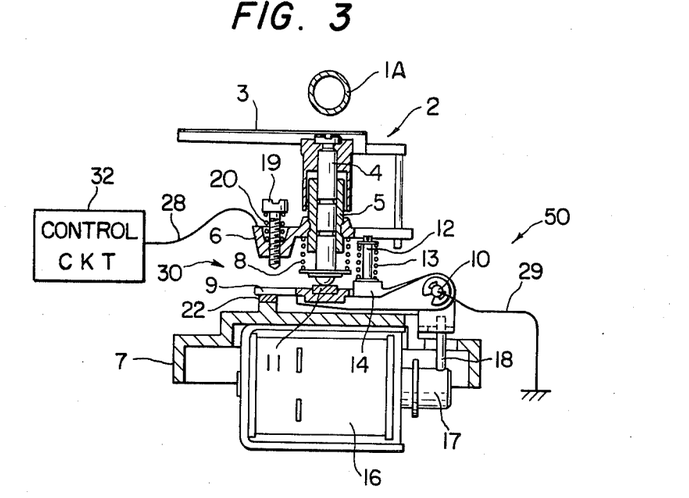
FIG. 3 is a cross-sectional view showing a part of a second embodiment tone arm mechanism according to the present invetion.

As will be appreciated from the above, the second rotary lever 14 has a long arm portion and a short arm portion, respectively extending in different directions from the shaft 10, and forming the described L-shape. The long arm portion has the above-mentioned portion interposed between the coil spring 13 and the first rotary lever 9, while the short arm portion which, as seen in the figures, is shorter than the long arm portion, has the above-mentioned other end of the lever 14. As shown in FIG. 3, the long arm portion extends in the same direction as that of the first rotary lever 9 from the shaft 10 when the first rotary lever 9 is fully lowered. Moreover, the long arm portion is shorter than the first rotary lever 9.

The reference numeral 19 is an adjusting screw engaged with a screw hole made in the bracket 6, and the maximum rotational angle of the first rotary lever 9 is determined by adjusting the height of the adjusting screw 19 by rotating the same. A coil spring 20 is interposed between the head of the adjusting screw 19 and the upper surface of the bracket 6 for preventing the screw 19 from being unsteady.

The reference numeral 21 is a rubber piece or washer, which functions as a silencer, and the rubber piece 21 prevents the first rotary lever 9 from making abnormal noise when it abuts against the second rotary lever 14. The reference 22 is also a rubber silencer for reducing abnormal sounds which occur when the first rotary lever 9 abuts against the base plate 7.

Now, it will be described how the elevating mechanism 50 operates. The solenoid 16 is arranged to receive electrical driving power from a suitable driving circuit and a switch. It is assumed that the switch is closed to energize the solenoid 16. When the switch of the solenoid turns on, the plunger 17 of the solenoid 16 moves leftward, applying a clockwise rotational force by the pin 18 to the second rotary lever 14. Then the second rotary lever 14 rotates, causing the coil spring 13 to start being compressed, and by the repulsive force of the coil spring 13 tends to bring up the fixed pin 12 upward, causing the first rotary lever 9 to start rotating clockwise. Accordingly, the up-down movement shaft 4 of the elevator 2 is raised by the first rotary lever 9, so that the tone arm 1 of the record player will be raised as shown in FIG. 2. The clockwise rotation of the first rotary lever 9 is then stopped by the adjusting screw 19 as shown.

In the above operation, although a great rotational force is applied suddenly to the second rotary lever 14 when the switch of the solenoid 16 turns on, since a counterclockwise force is applied to the second rotary lever 14 all the time by the coil spring 13, the second rotary lever 14 does not perform rapid rotation, while the first rotary lever 9 rotates by the repulsive force of the spring 13, and therefore, the first rotary lever 9 rotates slowly and extremely gently. As a result, the up-down movement shaft 4 of the elevator 2 performs only a slow rising movement. Furthermore, since the coil spring 8 is provided to the up-down movement shaft 4, the up-down movement shaft 4 receives a downward force from the spring 8 all the time, and therefore, the rising movement of the up-down movement shaft 4 is made further slow also by the spring 8. The coil spring 8 has a function of preventing the up-down movement shaft 4 from excessively rising, escaping from a condition of being in contact with the first rotary lever 9 whose maximum rotational angle is defined by the position of the adjusting screw 19. Accordingly, the height of the tone arm 1 to be raised is always defined by the rotational angle of the first rotary lever 9, and is constant. Furthermore, since a viscous and resistive material, such as silicone oil, is provided between the up-down movement shaft 4 and the bushing 5, the rising and lowering movement of the up-down movement shaft 4 becomes dull.

Nextly, let us assume that the switch of the solenoid 16 has been turned off to set down the tone arm 1. As the solenoid 16 is deenergized, the plunger 17 of the solenoid 16 moves rightward, and simultaneously, the first rotary lever 9 rotates immediately counterclockwise by the weights of the first rotary lever 9 and the second rotary lever 14 as well as by the repulsive force of the coil spring 13. Thus, the up-down movement shaft 4 of the elevator 2 will not be held by the first rotary lever 9 any more, and therefore, it starts lowering due to the weight of the elevator 2 and by the repulsive force of the coil spring 8, when the lowering movement is dull because of the presence of the silicone oil.

Figure 4:
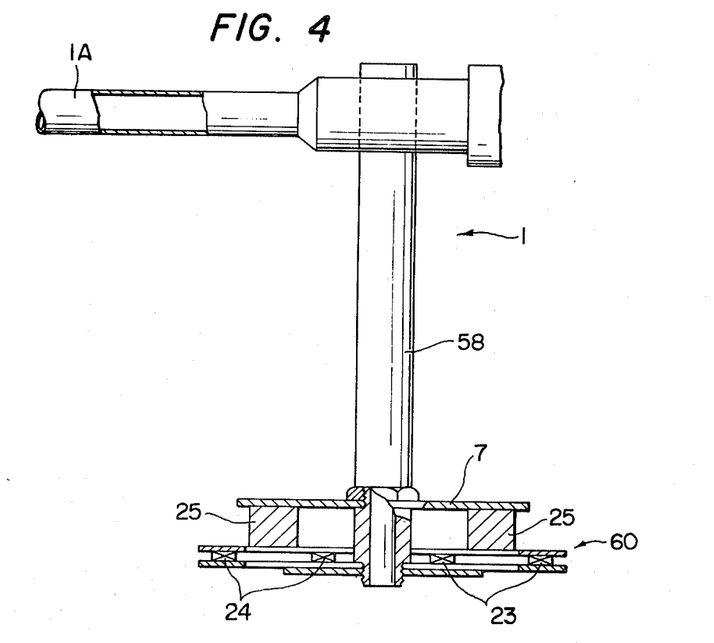
FIG. 4 is a partial cross-sectional view showing another part of the second embodiment.

Reference is now made to FIGS. 3 and 4 which show schematic cross-sectional views of a second embodiment tone arm mechanism according to the present invention. The second embodiment tone arm mechanism comprises a tone arm elevating mechanism 50 which is similar in construction to that of the first embodiment of FIGS. 1 and 2. The second embodiment differes from the first embodimet in that a portion of the elevating mechanism 50 is used as an electrical switch. In detail, the shaft 10, about which the first and second rotary levers 9 and 14 are swingable, is grounded via a lead wire 29, while the bracket 6 is connected via another lead wire 28 to a control circuit 32, such as a microcomputer. The shaft 10, the first rotary lever 9 are both made of a conductive material, so that the first rotary lever 9 is electrically connected to ground via the shaft 10 and the lead wire 29. Similarly, the bracket 6 as well as the adjusting screw 19 is made of a conductive material. With this arrangement, the combination of a tip portion of the adjusting screw 19 and a corresponding contacting portion in the first rotary lever 9 constitute contacts of an electrical switch. Namely, when the first rotary lever 9 is apart from the tip of the adjusting screw 19, the switch is in off state, and on the other hand, when the first rotary lever 9 is in contact with the tip of the adjusting screw 19, as shown in FIG. 2, the switch is closed to be in on state. This switch will be referred to as an UP switch because it will be closed when the tone arm 1 is raised by the elevator 2 of the elevating mechanism 50. Except for the operation of this UP switch, the tone arm mechanism of the second embodiment functions in the same manner as in the first embodiment. Namely, after the solenoid 16 has been energized, the first rotary lever 9 is rotated by the clockwise rotation of the second rotary lever 14, depressing the up-down movement shaft 4 of the elevator 2 upwardly. As a result, the arcuate arm 3 of the elevator 2 raises the tone arm 1. The clockwise rotation of the first rotary lever 9 is stopped by the adjusting screw 19, and at an instant, that the first rotary lever 9 comes into contact with the tip portion of the adjusting screw 19, the UP switch closes, connecting the lead wire 28 from the control circuit 32 to ground electrically. The base plate 7, to which the shaft 10 and the bracket 6 are both connected, is made of an insulating material. From the above, the UP switch in the second embodiment detects an instant that the tone arm 1 has been fully raised and is ready for horizontal movement. Therefore, this information from the UP switch may be used in the control circuit 32 in various ways for controlling various operations of the record player. Especially, the information indicative of the highest position of the tone arm 1 may be used for precisely controlling the horizontal movement of the tone arm as will be described hereinbelow with reference to FIGS. 4 and 5.

FIG. 4 shows a partial view of the tone arm 1 and its horizontally driving mechanism. The tone arm 1 has a rotary shaft 58 operatively connected to the pipe or arm portion 1A thereof. The rotary shaft 58 is rotatably attached to a stationary member, which may be the base plate 7, and is arranged to receive a rotational force from a motor 60. The motor 60 comprises a magnet 25, a driving coil 23 and a detection coil 24. Electric current flowing through the driving coil 23 of the motor 60 will be controlled by the control circuit 32 in receipt of the above-mentioned information indicative of the highest position of the tone arm 1.

Figure 5:
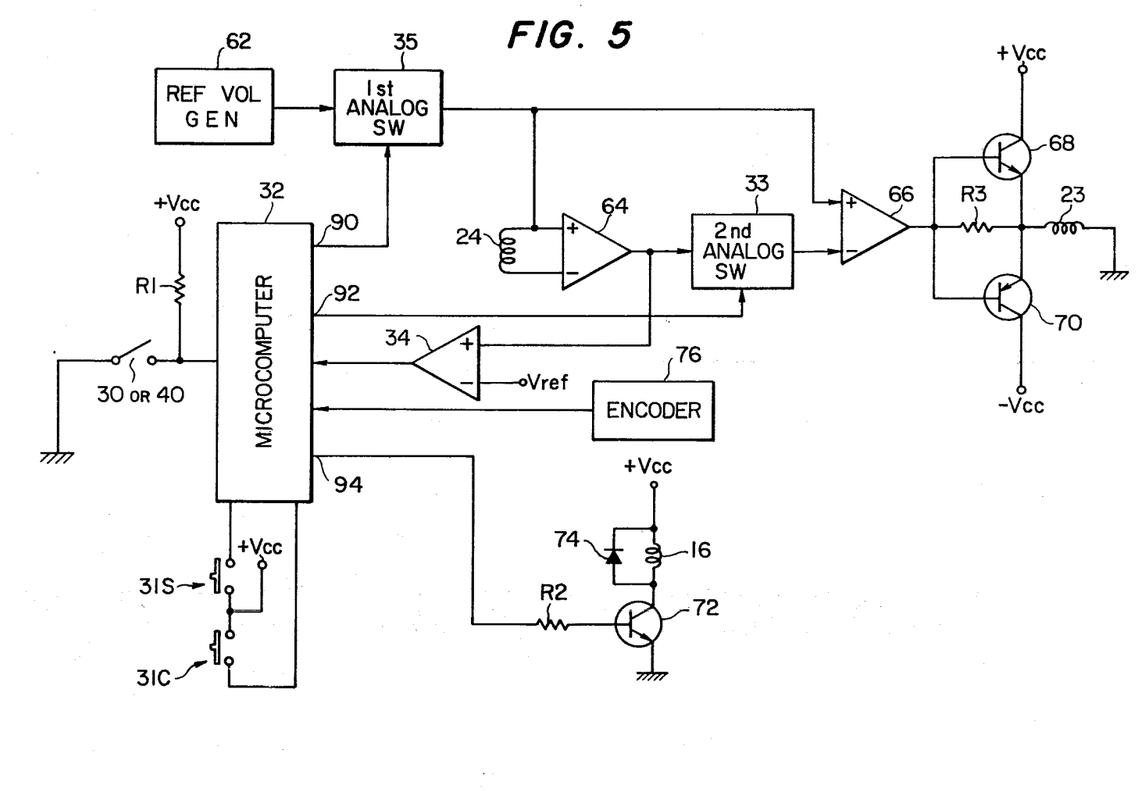
FIG. 5 is a circuit diagram used in the second embodiment of FIGS. 3 and 4 as well as in a third embodiment of FIGS. 6 and 7.

FIG. 5 is a circuit diagram of an electrical circuit including the control circuit 32 of FIG. 3. In this embodiment, a microcomputer is used as the control circuit 32. The electrical circuit of FIG. 5 comprises, in addition to the above-mentioned microcomputer 32, a pair of manual push-button switches 31S and 31C, which are normally open, an encoder 76, a reference voltage generator 62, first to third operational amplifiers 64, 66 and 34, first and second analog switches 35 and 33, first to third transistors 68, 70 and 72, first to third resistors R1, R2 and R3. The above-mentioned UP switch, i.e. the combination of the adjusting screw 19 and the first rotary lever 9, is deisgated at 30, and is connected via the resistor R1 to a positive power supply +Vcc, where the junction between the resistor R1 and the UP switch 30 is connected to an input terminal of the microcomputer 32. Each of the push-button switches 31S and 31C is interposed between the positive power supply +Vcc and an input terminal of the microcomputer 32. The first push-button switch 31S is referred to as a start-stop switch, while the other switch 31C is referred to as a cueing switch. The encoder 76 has a disk-like member (not shown) connected to the shaft 58 of the tone arm 1, and is arranged to produce given codes in accordance with the horizontal position or rotational angle of the tone arm 1. Namely, a plurality of sets of through-holes are made in the disk-like member which rotates with the tone arm shaft 58, so as to selectively pass light beams applied to the disk-like member from one side. The transmitted light beams are received by a plurality of photosensitive elements to produce various codes depending on the rotational position or angle of the disk-like member.

The microcomputer 32 has first to third output terminals 90, 92 and 94 respectively connected to the first and second analog switches 35 and 33, and to the third transistor 72 via the second resistor R2. The solenoid 16 of the tone arm elevating mechanism 50 is connected in parallel with a diode 74, and the parallel circuit is interposed between the positive power supply +Vcc and the collector of the transistor 74, whose emitter is grounded. The second resistor R2 is connected to the base of the transistor 72, so that on-off operations of the transistor 72 is controlled by a signal from the third output terminal 94 of the microcomputer 32. Namely, when the transistor 72 is conductive, an electric current flows via the solenoid 16, energizing the same. The diode 74 is for preventing a high counter electromotive force induced across the solenoid 16 from being applied to the transistor 72.

The reference voltage generator 62 may be formed by a voltage divider, and may comprise a potentiometer so that the output voltage may be manually adjustable. The output terminal of the reference voltage generator 62 is connected to an input terminal of the first analog switch 35, whose operating is controlled by a signal from the first output terminal 90 of the microcomputer 32.

The detection coil 24 shown in FIG. 4 is connected across the noninverting and inverting input terminals of the first operational amplifier 64, and the noninverting input terminal is further connected to the output terminal of the first anlaog switch 35. The output terminal of the first operational amplifier 64 is connected to the second analog switch 33, whose on-off operations is controlled by 2-bit information from the second output terminal 92 of the microcomputer 32. The output terminal of the second analog switch 33 is connected to an inverting input terminal of the second operational amplifier 66 having a noninverting input terminal connected to the output terminal of the first analog swich 35. The output terminal of the second operational amplifier 66 is connected via the third resistor R3 to the driving coil 23 of the motor 60 of FIG. 4, which driving coil 23 is grounded at the other end. The collector-emitter path of the first transistor 68 is interposed between the positive power supply +Vcc and a junction between the third resistor R3 and the driving coil 23, while the collector-emitter path of the second transistor 70 is interposed between the junction and a negative power supply −Vcc. The bases of the first and second transistors 68 and 70 are connected to the output terminal of the second operational amplifier 66.

The output terminal of the first operational amplifier 64 is further connected to a noninverting input terminal of the third operational amplifier 34, having an inverting input terminal to which a predetermined reference voltage Vref is applied. The output terminal of the third operational amplifier 34 is connected to an input terminal of the microcomputer 32.

The circuit of FIG. 5 operates as follows: Let us assume that the tone arm 1 is first positioned at a tone arm rest (not shown), and the user of the record player has depressed the start-stop push-button switch 31S. At this time the microcomputer 32 receives information, from the encoder 76, indicating that the tone arm 1 is on or above the tone arm rest. In receipt of the above information from the start-stop switch 31S and from the encoder 76, the microcomputer 32 sends an output signal via its third output terminal 94 to the third switching transistor 72 to render the same conductive. As a result, the solenoid 16 is energized causing the elevator 2 of the elevating mechanism 50 to raise the tone arm 1 as described in the above. When the tone arm 1 is fully raised, the UP switch 30 closes. This information is also applied from the UP switch 30 to the microcomputer 32, and thus, the microcomputer 32 delivers, via its second output terminal 92, a 2-bit information signal to the second analog switch 33. The first analog switch 35 usually emits a zero volt signal, blocking the voltage from the reference voltage generator 62, unless a given signal is applied from the microcomputer 32 as will be described later. On the other hand, the second analog switch 33 is capable of emitting one of four output voltages including zero volt, the voltage from the first operational amplifier 64, a positive voltage and a negative voltage. The positive and negative voltages are respectively emitted after superposed on the voltage from the second operational amplifier 33. The selection from these four voltages is effected in accordance with the 2-bit information from the microcomputer 32. In receipt of given information from the microcomputer 32, the second analog switch 33 selects the negative voltage, and this negative voltage is fed to the second operational amplifier 66. As a result, the second operational amplifier 66 emits an output signal with which the first transistor 68 becomes conductive, while the second switching transistor 70 remains nonconductive. Accordingly, an electric current flows via the collector-emitter path of the first transistor 68 into the driving coil 23 of the motor 60. Thus, the tone arm 1 is rotated leftward, when seen from the front of the record player, and therefore, the tone arm 1, which has been raised above the tone arm rest, is swung so that the stylus of the pickup cartridge will be positioned above a given position of the record disk on the turntable. The horizontal positon of the tone arm 1 is detected by the encoder 76, and when the horizontal angle equals a predetermined angle prestored in the memory of the microcomputer 32, the second analog switch 33 is switched by the 2-bit signal from the microcomputer 32 to emit zero volt output. Therefore, the driving coil 23 will be deenergized to terminate the leftward movement of the tone arm. Then, the micrcomputer 32 stops sending its output signal via its third output terminal 94 to the third transistor 72, deenergizing the solenoid 16 of the tone arm elevating mechanism 50. As a result, the first rotary lever 9 rotates counterclockwise, lowering the tone arm 1. Then the stylus will be put gently on a given position of the record disk to start playing the record. The above-described lowering operation of the tone arm 1 will be further described in detail in connection with the following third embodiment of FIGS. 6 to 8. As soon as the tone arm 1 starts lowering, the UP switch 30 becomes off.

The detection coil 24 of the motor 60 is used to detect the rotational or swinging speed of the tone arm 1 in the horizontal direction. Namely, a voltage proportional to the rotational speed of the tone arm 1 is induced across the detection coil 24, and this voltage is fed through the second analog switch 33 to the second operational amplifier, so that motional feedback is performed. Thus the swinging speed of the tone arm 1 in horizontal directions is controlled.

After the stylus has been placed on the record disk, the microcomputer 32 sends a given signal from its first output terminal 90 to the first analog switch 35 so that the output voltage from the reference voltage generator 62 is fed to the first and second operational amplifiers 64 and 66. At this time, in receipt of the 2-bit signal from the second terminal 92 of the microcomputer 32 the second analog switch 33 emits the output voltage from the first operational amplifier 64 as it is which voltage is slightly higher than the voltage at the noninverting input terminal of the second operational amplifier 66. Accordingly, the second operational amplifier 66 produces an output signal of low negative voltage with which the second transistor 70 is conductive allowing a limited amount of current to flow therethrough, while the first transistor 68 becomes nonconductive. As a result, an electric current flows from ground into the driving coil 23, flowing out via the second transistor 70. The direction of the current flowing through the driving coil 23 of the motor 60 determines the direction of the rotation of the motor 60, and therefore, the direction of the swing of the tone arm 1. With this operation, a rightward movement force is applied to the tone arm 1 from the motor 60, and this rightward movement force is selected to be substantially equal to the leftward force, which is naturally received by the tone arm 1 from the sound groove of the record disk. In other words, the tone arm 1 is biased outwardly with respect to the center of the turntable so as to offset inward force which is inherent to the tone arm scanning circular sound grooves. This means that so called antiskating effect has been attained.

When record playing is finished, the stylus is guided to spiral sound grooves which are spaced from each other by a relatively large distance compared to the sound grooves carring information, such as music. Thus, the tone arm 1 is moved leftward or inward at a speed higher than before. This relatively high speed in the tone arm movement is detected by the detection coil 24, so that the output level of the first operational amplifier 64 becomes high. The third operational amplifier 34 compares the voltage from the first operational amplifier 64 with the reference voltage Vref, and produces a high level output signal as soon as the inward movement speed of the tone arm 1 exceeds a given value. The output signal of the third operational amplifier 34 is fed to the microcomputer 32 to reenergize the solenoid 16 in the same manner as described in the above. Accordingly, the elevator 2 raises the tone arm 1, causing the stylus to come off the surface of the record disk. When tone arm 1 is fully raised, the UP switch 30 again closes to send information indicative of the status of the tone arm 1 to the microcomputer 32. Simultaneously, the microcomputer 32 receives information indicative of the horizontal angle of the tone arm 1 from the encoder 76. Thus, the microcomputer 32 emits a given information signal via its second output terminal 92 to the second analog switch 33. As a result, the second analog switch 33 selects a positive voltage with which the second operational amplifer 66 will be inverted. Thus the second transistor 70 becomes conductive, while the first transistor 68 is held nonconductive, causing an electric current to flow from ground into the driving coil 23 of the motor 60 to return the tone arm 1 to a position above the tone arm rest.

The aforementioned cueing switch 31C will be used as follows: Namely, when it is intended to interrupt record playing when the stylus is picking up sounds from the record disk, this cueing switch 31C may be manipulated. Namely, the user depresses the cueing push-button switch 31C once. The information from the cueing switch 31C is applied to the microcomputer 32 to produce an output signal which will be fed to the third transistor 72 to render the same conductive. Thus, the solenoid 16 of the tone arm elevating mechanism 50 is energized to elevate the tone arm 1. However, the signal which is being applied from the microcomputer 32 to the analog switch 33 is not changed. Therefore, the tone arm 1 is just raised vertically. Although the UP switch will be closed when the tone arm 1 is fully raised, the solenoid 16 is continuously energized to keep the stylus off the sound groove of the record disk. When it is intended to restart playing, the cueing switch 31C may be depressed again. Then the microcomputer 32 produces a low level output signal at its third output terminal 94 rendering the solenoid 16 deenergized. Consequently, the tone arm 1 is lowered to restart playing from the position where interruption has occurred.

In order to stop playing the record before the end of the record disk, the start-stop switch 31S may be depressed. The information from the start-stop switch 31S is fed to the microcomputer 32, and thus the solenoid 16 is energized to raise the tone arm 1. When the tone arm 1 is fully raised, the up switch 30 closes, and upon closure of the up switch 30 the microcomputer 32 controls the second analog switch 33 to energize the driving coil 23 in such a manner that the tone arm 1 will be moved rightward.

Figure 6:
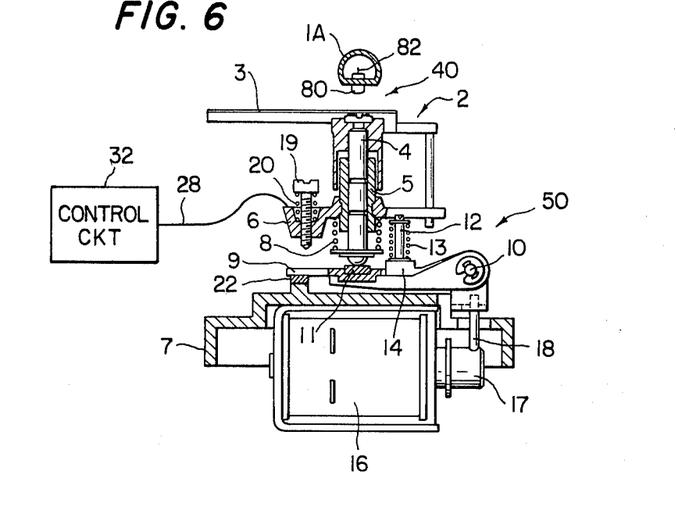
FIG. 6 is a cross-sectional view showing a part of the third embodiment tone arm mechanism according to the present invetion.
Figure 7:
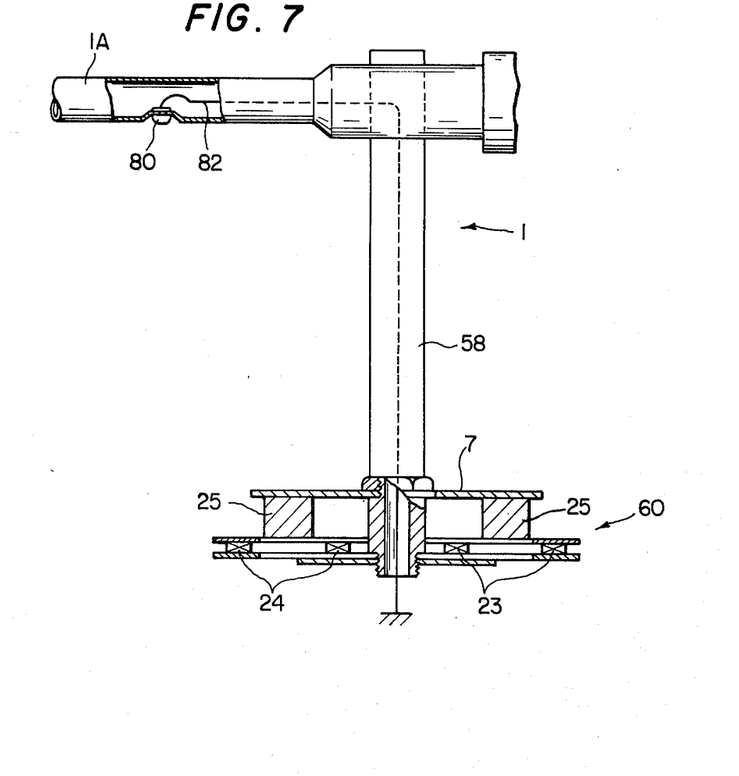
FIG. 7 is a partial cross-sectional view showing another part of the third embodiment.

Reference is now made to FIGS. 6 to 8 which show the third embodiment of the tone arm mechanism according to the present invention. The third embodiment differs from the above-described second embodiment in that a combination of a portion of the elevating mechanism 50 and a portion of the tone arm 1 is used as an electrical switch, which may be referred to as a DOWN switch. As shown in FIGS. 6 and 7, the bracket 6, which is made of a conductive material, is connected via a lead wire 28 to a control circuit 32, which may be a microcomputer in the same manner as in the second embodiment, while the tone arm 1 comprises a piece 80 made of conductive rubber which is electrically connected to ground via a lead wire 82. The arcuate arm 3 of the elevator 2 is made of a conductive material and is electrically connected via the up-down movement shaft 4, the coil spring 8 and the bushing 5, which are all made of conductive materials. The rubber piece 11 attached to the first rotary lever 9 is made of an insulating rubber, and the base plate 7 is also made of an insulating material. The conductive rubber piece 80 is attached to a lower portion of the pipe 1A of the tone arm 1 so as to be contactable with the arcuate arm 3 of the elevator 2. As is apparent from FIGS. 6 and 7, when the elevator 2 is in contact with the tone arm 1, the DOWN switch is closed, and on the other hand, when the elevator 2 is off the tone arm 1, the DOWN switch is open.

Therefore, this DOWN switch may be used to detect a particular state of the tone arm 1, in which the stylus has been placed on the record disk during lowering operation of the tone arm 1. The operation of the third embodiment tone arm mechanism will be described with reference to the electrical circuit diagram of FIG. 5.

The DOWN switch is designated at 40, and the electrical circuit of FIG. 5 may be used for both the above-described second embodiment and the third embodiment. Namely, the UP switch 30 of the second embodiment is replaced with the DOWN switch 40. However, if desired, both the UP switch 30 and DOWN switch 40 may be separately connected to the microcomputer 32. It is assumed that the tone arm 1 has been rotated leftward so that the stylus is above a given position of a record disk. The solenoid 16 is then deenergized to lower the tone arm 1. As soon as the stylus is placed on the record disk, the tone arm 1 is held by the stylus, and therefore, it does not further lower. The elevator 2 keeps lowering, and therefore, the arcuate arm 3 of the elevator 2 comes off the conductive rubber piece 80 of the tone arm 1. Namely, the DOWN switch 40 opens to send information to the microcomputer 32. The microcomputer 32 receives information indicative of the horizontal angle of the tone arm 1 from the encoder 76 in the same manner as in the second embodiment, so that the microcomputer 32 produces a 2-bit information signal which will be fed to the second analog switch 33. Thus the second analog switch 33 transmits the output voltage from the first operational amplifier 64 to the second operational amplifier 66 as is. With this operation, the aforementioned antiskating operation can be started immediately after the stylus has been placed on the record disk.

Turning back to the lowering operation, when lowering the tone arm 1, the horizontal angle of the tone arm is continuously detected by the encoder 76, and in order that the stylus is accurately placed on a given position on the record disk, the information from the encoder 76 is checked by the microcomputer 32. Namely, the microcomputer 32 sends the 2-bit information signal from the second terminal 92 to the second analog switch 33 so as to precisely control the horizontal angle of the tone arm 1 during the lowering operation.

From the above, it will be understood that the present invention provides a useful tone arm mechanism with which the tone arm can be accurately controlled, while the mechanism is simple in construction, small in size, and low in cost. The above-described embodiments are just examples of the present invention, and therefore, it will be apparent for those skilled in the art that many modifications and variations may be made without departing from the spirit of the present invention.

What is claimed is:

1. A tone arm mechanism for a record player, comprising:
   (a) first means for raising and lowering a tone arm of a record player with respect to a stationary member to which said tone arm is movably attached, said first means having a member positioned below said tone arm and movable between first and second positions with respect to said stationary member;
   (b) a first rotary lever rotatable at a first location about a shaft attached to said stationary member, and contactable with said first means at a point displaced from said first location by a first distance so that the rotation of said first rotary lever causes said first means to move between said first and second positions;
   (c) a second rotary lever rotatable about said shaft, said second rotary lever having a long arm extending from said shaft in a direction substantially the same as that of said first lever when said first lever is in said first position, and a short arm, which is shorter than said long arm, extending from said shaft in a different direction from that of said long arm, said long arm being shorter than said first distance of said first lever;
   (d) second means for transmitting the rotational force from said second rotary lever to said first rotary lever with a time delay, said second means having a spring operatively connected between said first lever and said long arm of said second rotary lever so that deformation of said spring transmits said rotational force to said first rotary lever with said time delay when said second rotary lever rotates in a given direction; and
   (e) a solenoid having a plunger operatively linked with said short arm of said second rotary lever for driving said second rotary lever,
   whereby displacement of said short arm of said second rotary lever is amplified by said second rotary lever and further amplified by said first rotary lever to provide amplified movement of said first means.

2. A tone arm mechanism as claimed in claim 1 wherein said stationary member comprises a pivot for vertical movement of said tone arm and wherein said first and second means and said first and second rotary levers are disposed between said stationary member and a pickup head attached to said tone arm for applying lifting and lowering movement to said tone arm to lift and lower the pickup head, respectively, responsive to energization and deenergization of said solenoid.

3. A tone arm mechanism as claimed in claim 1, wherein said second means comprises a pin fixed to the surface of said first rotary lever, and inserted through a through-hole made in said second rotary lever, said coil spring being engaged with said pin and interposed between said second rotary lever and tip portion of said pin.

4. A tone arm mechanism as claimed in claim 1, wherein said first means comprises a bracket fixed to said stationary member, a bushing fixed to said bracket, an up-down movement shaft movably received in said bushing, and an arm member connected to said up-down movement shaft.

5. A tone arm mechanism as claimed in claim 4, wherein said first means further comprises means for biasing said up-down movement shaft downwardly.

6. A tone arm mechanism as claimed in claim 5, wherein the biasing means comprises a coil spring interposed between the lower surface of said bracket and a washer fixed to the bottom end of said up-down movement shaft.

7. A tone arm mechanism as claimed in claim 5, wherein said first means further comprises means contactable with said first rotary lever for stopping the rotation of said first rotary lever.

8. A tone arm mechanism as claimed in claim 7, wherein the stopping means comprises an adjusting screw engaged with a screw hole made in said bracket.

9. A tone arm mechanism as claimed in claim 8, wherein said first means further comprises a coil spring interposed between the screw head of said adjusting screw and the upper surface of said bracket.

10. A tone arm mechanism as claimed in claim 4, wherein said first rotary lever comprises a rubber piece attached to the surface thereof for reducing noises which occur when abutting against said up-down movement shaft.

11. A tone arm mechanism as claimed in claim 1, further comprising a rubber piece attached to one of said first and second rotary levers for reducing noises when occur when said first and second rotary levers come into contact.

12. A tone arm mechanism as claimed in claim 1, wherein said second rotary lever is substantially L-shaped and has a through-hole for receiving a pin connected to said plunger of said solenoid.

13. A tone arm mechanism as claimed in claim 4, further comprising a viscous and resistive material between said up-down movement shaft and said bushing.

14. A tone arm mechanism as claimed in claim 13, wherein said viscous and resistive material is silicone oil.

15. A tone arm mechanism as claimed in claim 1, wherein said stationary member is a base plate made of an insulating material.

16. A tone arm mechanism as claimed in claim 8, wherein said bracket, adjusting screw, first rotary lever and said shaft are all made of a conductive material, said bracket and said shaft being respectively connected to a control circuit, which controls the operation of said tone arm, so that the combination of said adjusting screw and said first rotary lever functions as an electrical switch for detecting the highest position of said tone arm.

17. A tone arm mechanism as claimed in claim 6, wherein said bracket, coil spring engaged with said up-down movement shaft, up-down movement shaft, arm member are made of a conductive material, said bracket and a portion of said tone arm being respectively electrically connected to a control circuit, which controls the operation of said tone arm, so that the combination of said arm member and said portion of said tone arm functions as an electrical switch for detecting that a stylus of a pickup of said tone arm has been placed on a record disk when said arm member is lowering.

18. A tone arm mechanism as claimed in claim 17, wherein said portion of said tone arm comprises a conductive rubber piece attached to the lower side of the arm portion of said tone arm.

19. A tone arm mechanism as claimed in claim 17 or 18, wherein said control circuit comprises:
(a) a microcomputer responsive to said electrical switch, to information indicative of the horizontal angle of said tone arm, and to information from manually operable switches;
(b) a driving circuit responsive to a signal from said microcomputer for controlling the energization of said solenoid; and
(c) a switching circuit for controlling the horizontal movement of said tone arm in accordance with information from said microcomputer.

20. A tone arm mechanism as claimed in claim 19, wherein said switching circuit comprises:
(a) a reference voltage generator;
(b) a first analog switch responsive to said information from microcomputer for emitting one of the voltage from said reference voltage generator and zero voltage;
(c) a first operational amplifier responsive to a voltage from a detection coil of a driving motor, which drives said tone arm in horizontal directions, for producing an output voltage;
(d) a second analog switch responsive to said output voltage from said first operational amplifier and to various predetermined voltages for selectively emitting one of said voltages in accordance with information from said microcomputer;
(e) a second operational amplifier responsive to the voltage from said first and second analog switches for producing an output voltage; and
(f) a further driving circuit responsive to the output voltage of said second operational amplifier for controlling the amount and directions of the electric current flowing through a driving coil of said driving motor.

21. A tone arm mechanism as claimed in claim 20, further comprising a third operational amplifier responsive to said output voltage of said first operational amplifier and to a reference voltage for producing an output signal indicative of a relatively high speed in the movement of said tone arm in a given direction, said output signal being fed to said microcomputer.

22. A tone arm mechanism for a record player, comprising:
(a) first means for raising and lowering a tone arm of a record player with respect to a stationary member to which said tone arm is movably attached, said first means having a bracket fixed to said stationary member, a bushing fixed to said bracket, an up-down movement shaft movably received in said bushing, an arm member connected to said up-down movement shaft and positioned below said tone arm and movable between first and second positions with respect to said stationary member, and a biasing means for biasing said up-down movement shaft downwardly, wherein said bracket, biasing means, up-down movement shaft and arm member are each made of a conductive material, said bracket and a portion of said tone arm being respectively and electrically connected to a control circuit means for controlling the operation of said tone arm, so that the combination of said arm member and said portion of said tone arm functions as an electrical switch for detecting that a stylus of a pickup of said tone arm has been placed on a record disk when said arm member is lowering, said control circuit means having:
a microcomputer responsive to said electrical switch, to information indicative of a horizontal angular displacement of said tone arm, and to information from manually operable switches;
a switching circuit means for controlling the horizontal movement of said tone arm in accordance with information from said microcomputer;
said switching circuit means having:
a reference voltage generator generating a reference voltage;
a first analog switch responsive to information from said microcomputer for selectively emitting one of the voltage from said reference voltage generator and zero voltage;
a first operational amplifier responsive to a voltage from a detection coil of a driving motor which drives said tone arm in horizontal directions, said first operational amplifier operable for producing an output voltage;

a second analog switch responsive to said output voltage from said first operational amplifier and to various predetermined voltages for selectively emitting one of said voltages in accordance with information from said microcomputer;

a second operational amplifier responsive to the voltages emitted by said first and second analog switches for producing an output voltage; and a first driving circuit responsive to the output voltage of said second operational amplifier for controlling the amount and direction of electric current flowing through a driving coil of the driving motor which drives said tone arm in horizontal directions;

(b) a first rotary lever rotatable about a shaft attached to said stationary member, and contactable with said first means;

(c) a second rotary lever rotatable about a shaft attached to said stationary member;

(d) second means for transmitting the rotational force from said second rotary lever to said first rotary lever, said second means having an elastic member for absorbing shock from said second lever;

(e) a solenoid means having a plunger operatively linked with said second rotary lever for driving said second rotary lever; and (f) a second driving circuit means responsive to a signal from said microcomputer for controlling the energization of said solenoid means.

23. A tone arm mechanism as claimed in claim 22 wherein said portion of said tone arm comprises a conductive rubber piece attached to the lower side of the arm portion of said tone arm.

24. A tone arm mechanism as claimed in claim 22, further comprising a third operational amplifier responsive to said output voltage of said first operational amplifier and to a reference voltage for producing an output signal indicative of a relatively high speed in the movement of said tone arm in a given direction, said output signal being fed to said microcomputer.

* * * * *